No. 657,831. Patented Sept. 11, 1900.
V. POWERS.
ACETYLENE GAS GENERATOR.
(Application filed Aug. 4, 1899.)
(No Model.)
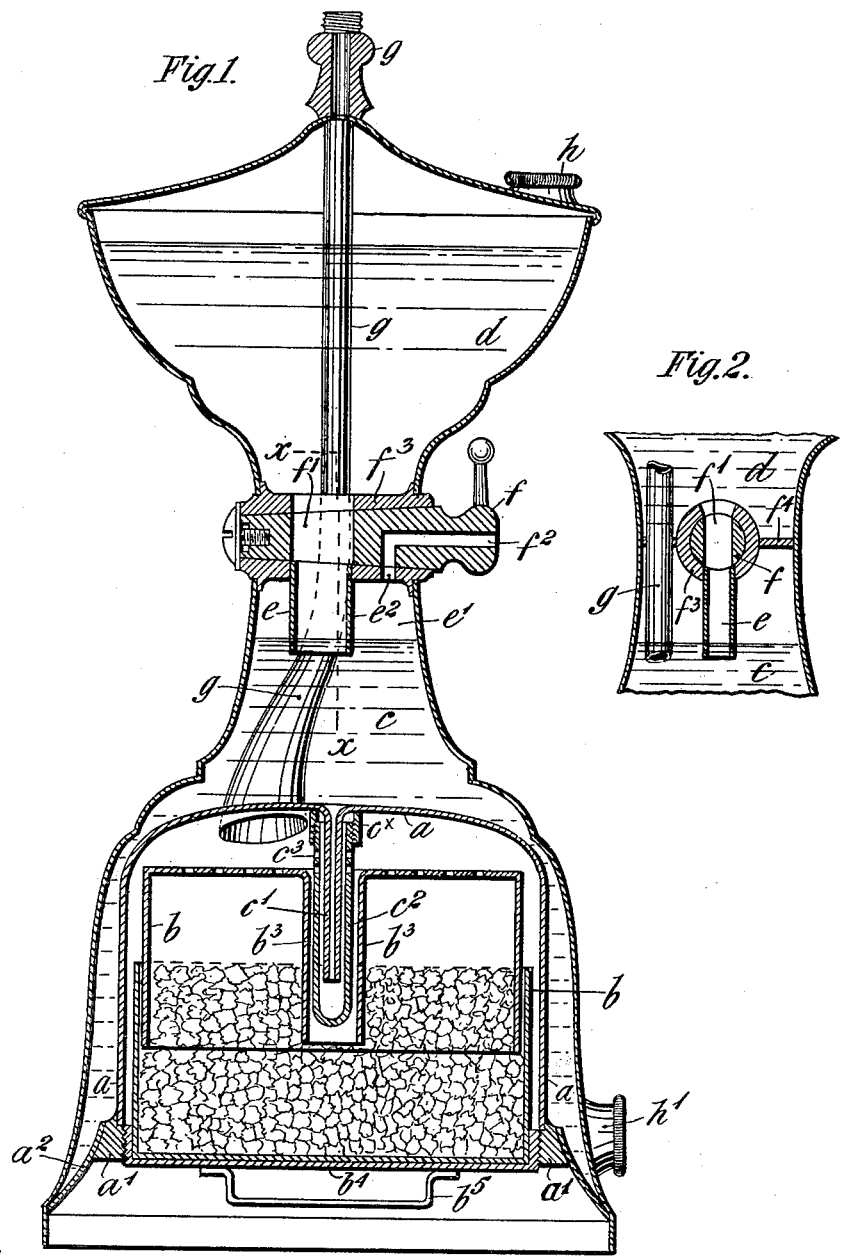
Witnesses.
Inventor
Victor Powers.
By James L. Norris
Atty.

UNITED STATES PATENT OFFICE.

VICTOR POWERS, OF LONDON, ENGLAND, ASSIGNOR TO THE VICTOR LIGHT SYNDICATE, LIMITED, OF SAME PLACE.

ACETYLENE-GAS GENERATOR.

SPECIFICATION forming part of Letters Patent No. 657,831, dated September 11, 1900.

Application filed August 4, 1899. Serial No. 726,180. (No model.)

*To all whom it may concern:*

Be it known that I, VICTOR POWERS, a subject of the Queen of Great Britain, residing at London, England, have invented new and useful Improvements in Acetylene Lamps and Generators, of which the following is a specification.

This invention relates to acetylene generators in which the water for the reaction is supplied to the carbid from a chamber in which it is maintained at a constant level and the pressure of the gas controls the flow of such water to the carbid.

In a generator constructed according to this invention the water is supplied to the constant-level chamber from an air-tight water-reservoir, and so long as the generator is working properly the reservoir outlet or mouth is immersed in or covered by the water in the constant-level chamber. Hence the flow from the reservoir only takes place as required to maintain this level. If, however, the reservoir be opened, say, for refilling, the immersion of its mouth will no longer act as a check, since the air will now have free access to the top of the water. Consequently if no safeguard be provided the proper level of the water in the constant-level chamber will be no longer maintained, and, moreover, a rush of water into the carbid-chamber may easily occur or the water may overflow from the generator and cause damage. To prevent this, means are provided whereby the constant-level chamber can practically be closed or isolated and made independent of the other parts of the generator during the refilling of the reservoir, this being done by a specially-arranged double-acting cock, which may be adapted to simultaneously control, say, the air - orifice and the inlet (or the outlet) for water or may only control the two latter without reference to the air-orifice, either arrangement being effective for the purpose in view.

In the annexed drawings, Figure 1 is a vertical central section of a portable form of the improved generator suitable for use as a lamp having the double-acting cock arranged to control the air-orifice and the water-inlet of the constant-level chamber. Fig. 2 is a fragmentary vertical section on the line $x\,x$, Fig. 1, at right angles to the latter figure.

$a$ is the reaction-chamber, which is water-jacketed, as shown, and in which is situated the carbid-container $b$. This carbid-container consists of a metal casing formed in two parts, as shown, fitting tight and easy one in the other, the upper part having a perforated top.

$b^3$ is a central distributing-pipe fitted in the upper part of the container to direct the water into the carbid charge.

$b^4$ is a removable gas-tight bottom adapted to screw into the reaction-chamber and having a handle $b^5$ to facilitate its manipulation. This bottom serves to receive and support the carbid-container.

$c$ is the constant-level chamber from which the water passes into the reaction-chamber.

$c'$ and $c^2$ are a pair of depending pipes arranged concentrically below the constant-level chamber. The outer pipe is closed at its lower end, while its upper end is screwed into a socket $c^\times$ inside the top of the chamber $a$ and has openings $c^3$, through which the water finally emerges after flowing down the inner tube and upward between said tubes.

$d$ is the air-tight reservoir, which keeps the chamber $c$ supplied through a tubular outlet or mouth $e$. $e'$ is an air-space around the said mouth, which is kept open to the atmosphere through an orifice $e^2$ in the manner about to be described. The casing of the reservoir $d$ forms a continuation of that of the chamber $c$, while the body of the chamber $a$ rests on a screw-ring $a'$, supported by an annular band $a^2$, secured inside the lamp-casing.

$f$ is the double-acting cock for isolating the constant-level chamber. It will be seen that in this instance it is arranged so as to control simultaneously the tubular mouth $e$ and the air-orifice $e^2$ by passages $f'$ and $f^2$, respectively. The passage $f'$ extends transversely across the cock, while the passage $f^2$ is bent at right angles, as shown, one portion thereof extending radially to the orifice $e^2$, and the other portion extending axially through the cock $f$ and opening into the atmosphere. The casing $f^3$ of the cock is secured in the outer wall of the generator and has on each side of it a transverse plate $f^4$, which forms the bottom of the reservoir $d'$.

$g$ is the outlet-tube for the gas, which extends upward through the water in $c$ and $d$ to cool the gas. This tube is widened at its lower end to prevent choking by drops of condensed moisture, and its upper end in this case carries a screw-nipple $g'$ for the attachment of the burner.

$h$ is a filling-hole for the reservoir $d$, and $h'$ is an emptying-hole for the jacket of the chamber $a$, this jacket forming in reality a downward continuation of the constant-level chamber, although obviously it might be a separate space, if desired. The said holes $h\ h'$ are provided with screw caps or plugs.

The action of the generator is as follows: Assuming the parts to be in the position shown, the water from the chamber $c$ flows through the pipes $c'$ and $c^2$ and out at the orifices $c^3$. It then trickles down into the distributing-pipe $b^3$ and so reaches the carbid and sets up the generation of the gas. The generation then proceeds until the gas-pressure balances the head of water between the orifices $c^3$ and the level in the chamber $c$, and thus checks the further inflow automatically until the pressure commences to fall. The flow of water from the chamber $c$ naturally tends to reduce the level therein; but immediately this takes place the consequent partial uncovering of the mouth $e$ will allow a little air to bubble up into the reservoir $d$, and a slight flow of water will then take place from the mouth $e$, so restoring the level. When the reservoir $d$ requires refilling or a fresh carbid-container has to be placed in the reaction-chamber, the cock $f$ is turned so as to simultaneously close both the water-inlet $e$ and the air-orifice $e^2$. This insures the body of water in the chamber $c$ remaining unaffected during the refilling operation, since on the closing of the air-orifice $e^2$ the atmospheric pressure will prevent any outflow through the pipes $c'\ c^2$. Everything is thus kept ready to recommence the generation of the gas at the proper pressure as soon as the cock $f$ is opened.

What I claim is—

1. In an acetylene-generator, the combination of an air-tight reservoir, a reaction-chamber, a gas-outlet therefrom, a constant-level chamber between said reservoir and reaction-chamber and communicating with the latter, a tubular mouth for said reservoir extending to the constant water-level, an air-space around said mouth, and means for simultaneously opening and closing said mouth and air-space, substantially as described.

2. In an acetylene-generator, the combination of an air-tight reservoir, a constant-level water-supply chamber, a tubular mouth extending from said reservoir into said chamber, an air-orifice leading into said chamber, and a double-acting cock for simultaneously controlling said mouth and air-orifice, substantially as described.

In witness whereof I have hereunto signed my name in the presence of two subscribing witnesses.

VICTOR POWERS.

Witnesses:
GEORGE ERNEST MINTERN,
FRED C. HARRIS.